Oct. 27, 1953

S. OVSHINSKY 2,656,588

RETRACTABLE BAR FEEDING MACHINE

Filed March 24, 1949

INVENTOR.
STANFORD OVSHINSKY
BY
William Isler
ATTORNEY.

Oct. 27, 1953
S. OVSHINSKY
2,656,588
RETRACTABLE BAR FEEDING MACHINE
Filed March 24, 1949
5 Sheets-Sheet 2
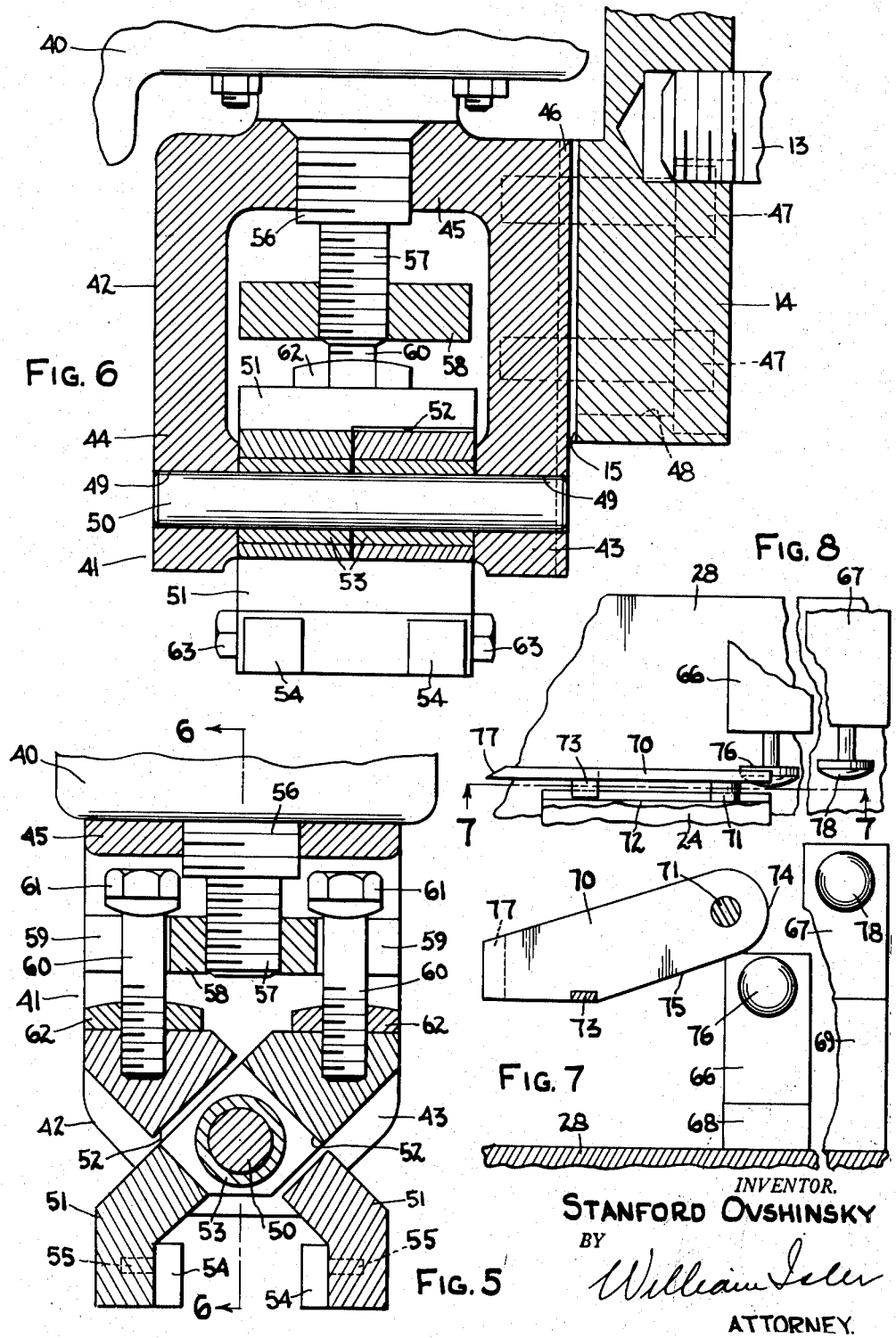
INVENTOR.
STANFORD OVSHINSKY
BY
William Iller
ATTORNEY.

Oct. 27, 1953 S. OVSHINSKY 2,656,588
RETRACTABLE BAR FEEDING MACHINE
Filed March 24, 1949 5 Sheets-Sheet 3

INVENTOR.
STANFORD OVSHINSKY
BY
William Isler
ATTORNEY.

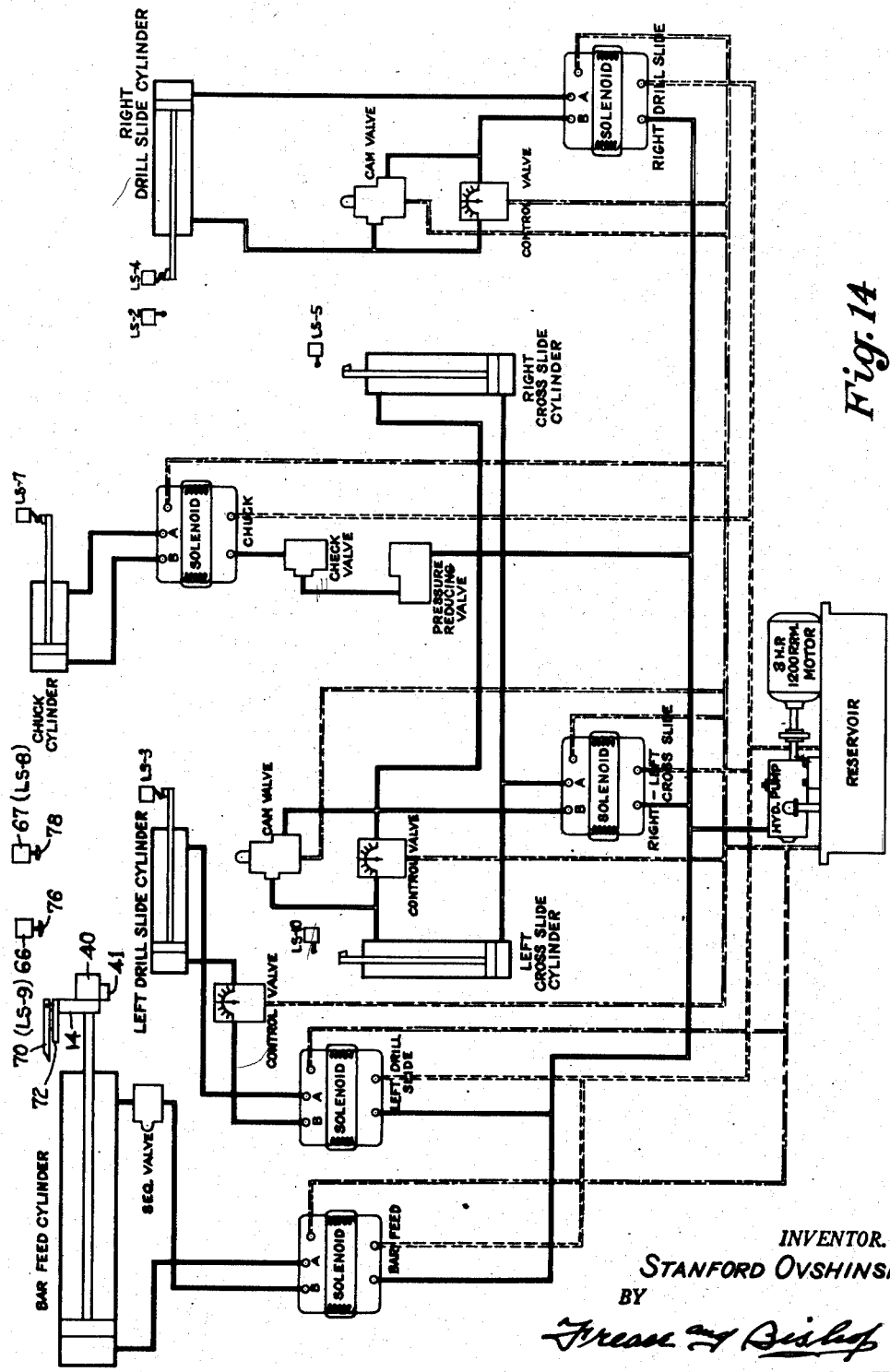

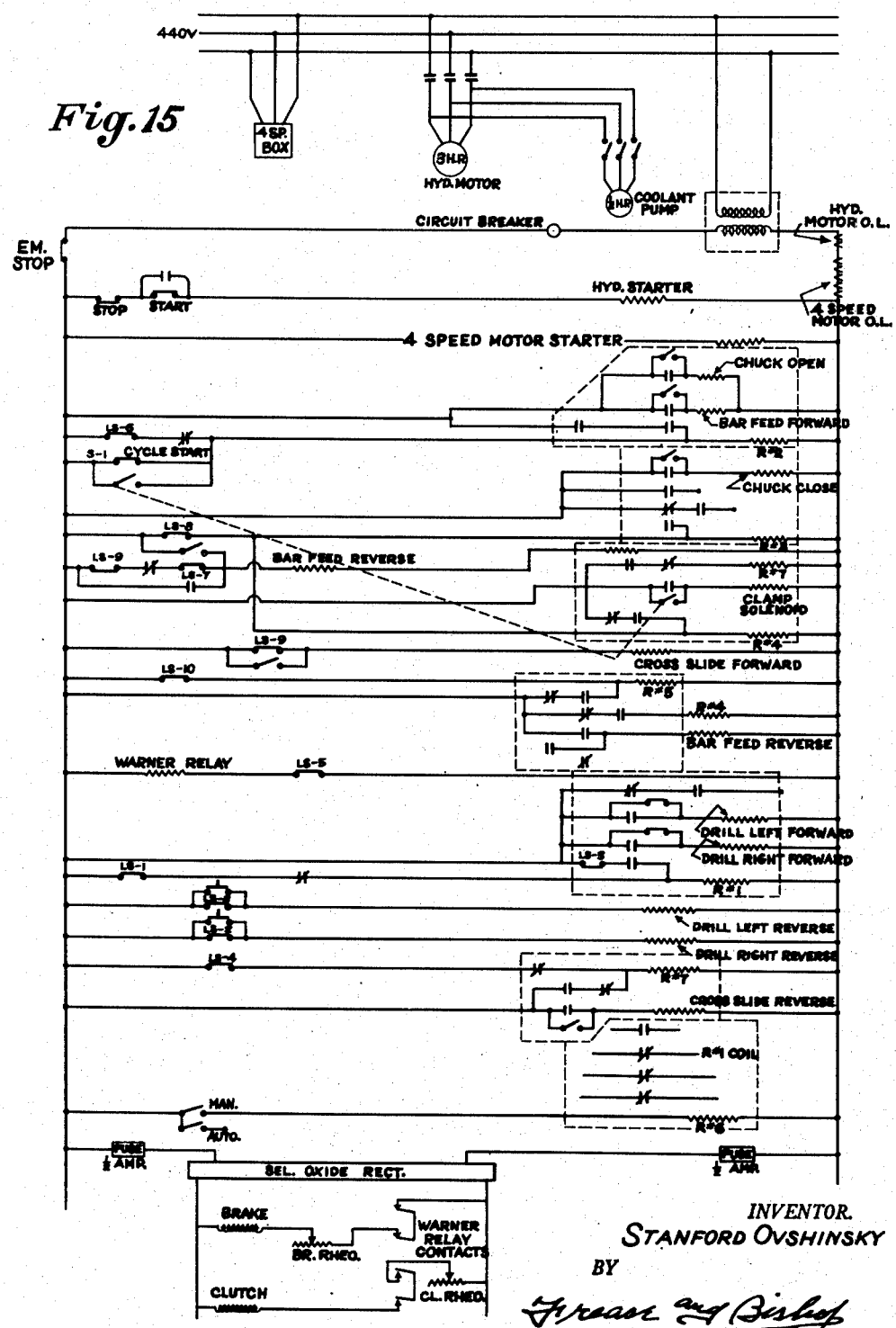

Patented Oct. 27, 1953

2,656,588

UNITED STATES PATENT OFFICE 2,656,588

RETRACTABLE BAR FEEDING MACHINE

Stanford Ovshinsky, Akron, Ohio, assignor to The Stanford Roberts Manufacturing Company, Akron, Ohio, a corporation of Ohio Application March 24, 1949, Serial No. 83,138

9 Claims. (Cl. 29—61)

This invention relates generally to automatic machines or feeders for supplying bar stock to automatic metal turning equipment such as lathes, screw machines, and the like, and more particularly, the present invention concerns itself with a bar feeding machine which is adapted to retract the bar stock during part of the cycle of operation.

In my co-pending applications for United States Letters Patent, Serial No. 750,391, filed May 26, 1947, now Patent No. 2,619,709, granted December 2, 1952, and Serial No. 52,719, filed October 4, 1948, I disclose and describe center driven lathes having certain unique features therein set forth in detail. In further developing the principle of operation disclosed in the aforesaid applications, I have designed a center driven lathe which is completely automatic. However, in order to fully utilize the efficiency of the lathe, I have had to develop the feeding mechanism which is the subject of this invention.

It is the primary object of my invention to provide a bar stock feeding mechanism which not only advances the stock to the working zone, but also retracts or withdraws the stock from the working zone so as to allow space for the cutting tools to operate simultaneously on both ends of a work-piece.

Another object of my invention is to provide a feeding machine of the character described, which permits extreme flexibility of operation in combination with a machine tool of the center-driven type.

Still another object of my invention is to provide a device of the character described, which is composed of relatively few parts compactly assembled.

Other objects and advantages of the invention will be apparent during the course of the following description.

In the accompanying drawings, forming a part of this specification, and in which like numerals are employed to designate like parts throughout the same, Fig. 1 is a fragmentary side elevation of a bar feeding machine embodying the features of my invention, various positions of the clamping mechanism being shown in broken lines.

Fig. 2 is a fragmentary cross-sectional view, taken on line 2—2 of Fig. 1, showing the guide rail and the support therefor.

Fig. 3 is a fragmentary cross-sectional view, taken on line 3—3 of Fig. 1, showing details of the clamp support and guide.

Fig. 4 is a fragmentary cross-sectional view, taken on line 4—4 of Fig. 1, showing the feed rail, the clamp guide not being shown in this view.

Fig. 5 is an enlarged fragmentary cross-sectional view, taken substantially on line 5—5 of Fig. 1 and showing details of the clamp assembly.

Fig. 6 is a fragmentary longitudinal cross-sectional view of the clamp assembly taken on line 6—6 of Fig. 5.

Fig. 7 is a fragmentary side elevational view of the switch tripping arrangement, taken substantially on line 7—7 of Fig. 8, portions thereof being in section.

Fig. 8 is a top plan view of the switch tripping arrangement shown in Fig. 7.

Figure 9:
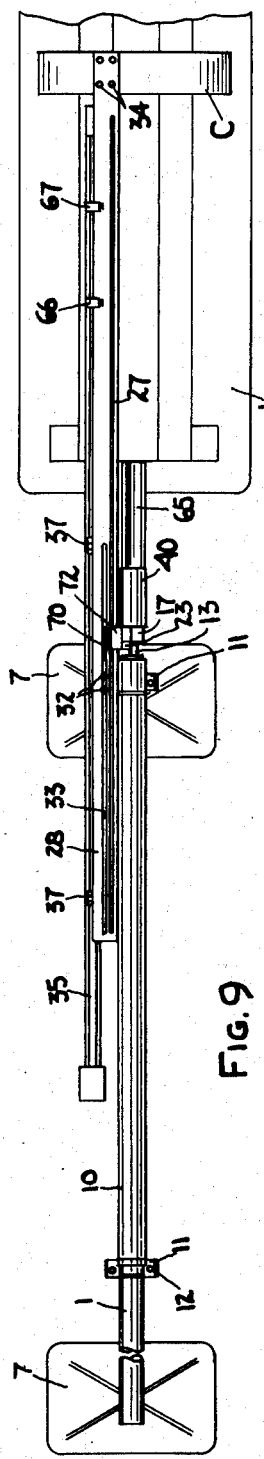
Fig. 9 is a top plan view of the bar feed mechanism shown in Fig. 1.
Figure 11:
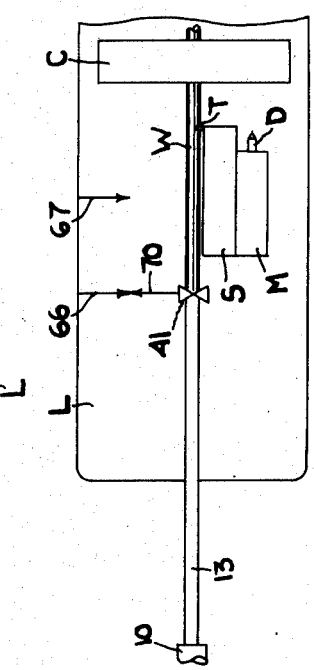
Figure 13:
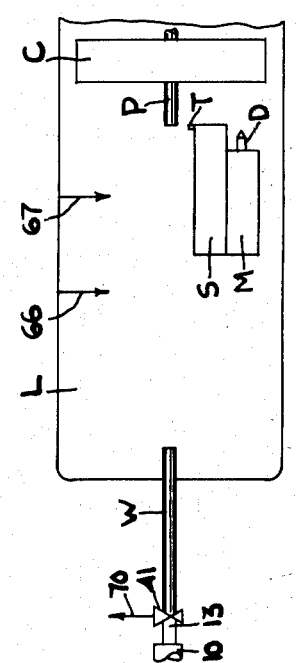
Figure 10:
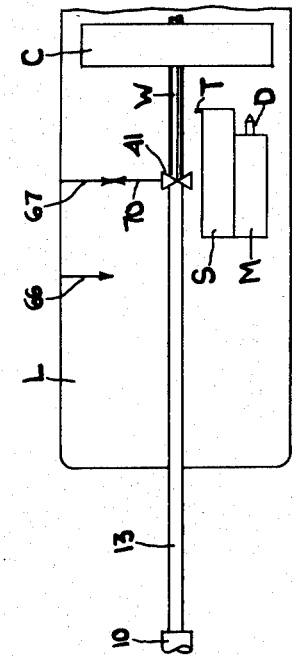
Figure 12:
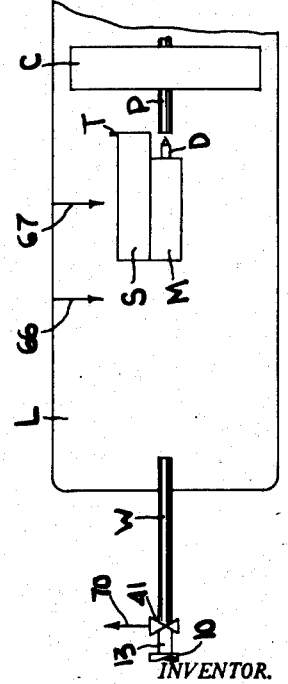

Figs. 10, 11, 12 and 13 are diagrammatic top plan views of the bar feed mechanism, the lathe, and the tool slides, showing their various positions during a cycle of operation; Fig. 10 shows the bar being fed into the chuck; Fig. 11 shows the cut-off operation; Fig. 12 shows the centering or drilling operation; and Fig. 13 shows the position of the parts when the work cycle is completed.

Fig. 14 is a diagram of the hydraulic system, including the solenoid valves, limit switches, and sensitive plunger button switches.

Fig. 15 is a diagram of the electric system, including relays and controls.

Referring more particularly to Figs. 1 to 4 of the drawings, the bar feed machine comprises a receiving tube I which lies in and is rigidly secured, as by welding, to a plurality of longitudinally spaced support blocks 2. The supports are herein shown as being in the form of V-blocks to aid in properly centering the tube in the blocks prior to welding, however, it will be understood that other forms of blocks may be utilized.

The block 2 has a central opening 3 extending vertically therein, which is adapted to receive slidably an extension 5 of an adjusting sleeve 4 which, in turn, is threadedly secured to a standard 6 which is mounted in a heavy base plate 7. The standard 6 is secured to the base plate by means of cap screw 8 which extends laterally through a portion of the base plate 7 into radial abutment with the standard.

A diametrical opening 9 is provided in the adjusting sleeve 4 which permits a rod to be passed therethrough to assist in rotating the sleeve relatively to the standard 6, thereby permitting adjustment of the height of the tube I above floor level and also providing a means for leveling the tube.

Mounted in parallelism with the longitudinal axis of the tube 1 and rigidly secured thereto is a hydraulic cylinder 10 having spaced pedestal portions 11 which are secured by means of cap screws to threaded cylinder support blocks 12 which are welded to the tube 1. A suitable piston assembly including a piston rod 13 is mounted in the cylinder 10 for reciprocable movement therein in response to a controlled hydraulic pressure system, suitable hose connections (not shown) being provided at opposite ends of the cylinder to provide a flow path for the hydraulic fluid.

In addition to the piston rod 13, the piston assembly includes a piston reciprocable in the cylinder 10 between the opposite ends of the cylinder, and the cylinder 10 and piston assembly may otherwise be termed a double-acting reciprocating fluid motor. Each hose connection, as is usual in such hydraulic apparatus, communicates with a supply of the hydraulic fluid under pressure, and in each hose connection between the cylinder and the supply of hydraulic fluid there may be provided a valve which may be a usual solenoid operated valve for opening and closing to open and close the flow path of the hydraulic fluid at desired times. Such an electrically controlled or interlocked double-acting reciprocating fluid motor is illustrated and described in detail in U. S. Letters Patent No. 2,397,351, issued March 26, 1946 to R. M. Heintz et al.

The end of the piston rod 13 is threadedly secured to a vertically extending adjusting plate 14 which has a recessed slideway 15 formed therein for a purpose hereinafter described. The top of the plate 14 has formed thereon a horizontal tongue or tenon 16 which projects into a recess 18 formed on an adjusting block 17 which is secured, as by screws 19, to the plate 14.

Mounted adjacent to the block 17 is an angular guide bar 20 which is secured to the block 17 by screws 21 which extend through a vertical slot 22 formed in a flanged portion 23 of the guide bar. The bar 20 has a laterally projecting extension 24, to the undersurface of which is secured a T-shaped runner 25, as by screws 26.

The stem or tenon of the runner 25 projects into a groove 27 which is cut into the upper surface of a horizontal guide rail 28 which is mounted in parallelism with the longitudinal axis of the receiving tube 1 and the cylinder 10. The guide rail 28 is secured in a position to one side of and slightly elevated above the cylinder 10 by means of a vertical support member 29 which is secured to the support block 12 as by screws 30, which extend through a slot 31 in the member 29.

The upper end of the member 29 underlies the guide rail 28 and the rail is secured thereto by means of cap screws 32 which extend through a slot 33 formed in the rail 28.

The forward end of the guide rail 28 overlies the chuck C of the lathe L and is rigidly secured thereto by screws 34. Additional support for the guide rail may be provided by an upright 79 which is secured to the lathe L and which underlies the guide rail and is secured thereto as by screws 80.

A feed rail 35, which is suitably constructed to contain conductor strips for the passage of electrical current, is suspended or hung from the guide rail 28 by suitable hangers 36 which are secured to the guide rail by screws 37 which extend through spacer elements 38.

A rigid connector 39 which is slidable in the feed rail 35 is secured to a solenoid operated air valve and cylinder 40 which surmounts the clamp assembly 41 which is shown in detail in Figs. 5 and 6.

The rigid connector 39 may constitute a conductor connected with one terminal of the solenoid of the solenoid operated air valve and cylinder 40, the other terminal of the solenoid being connected to ground. The solenoid operated air valve and cylinder 40 may be otherwise termed a solenoid operated fluid valve and reciprocating motor, and may include within the cylinder a piston which is double-acting in a manner similar to the piston in the cylinder 10.

The clamp assembly is designed to grip the bar stock and move it in response to movement of the piston rod 13. It comprises a yoke member 42 which is of general U-shaped form having leg portions 43 and 44 and an upper web portion 45. The exterior face of the leg 43 has formed thereon a vertically extending tongue or tenon 46 which is complementary to the slideway 15 on the adjusting plate 14. The clamp assembly is secured to the adjusting plate 14 by means of screws 47 which extend through slots 48 provided in the plate.

Aligned openings 49 are provided in the legs 43, 44 in which is journalled a pivot pin 50. On the pin 50 are rotatably mounted two clamp fingers 51 in such a manner as to form tongs, each of the fingers 51 having a recessed portion 52 so as to permit a loose interlocking of the fingers in assembly. The recesses 52 are large enough, however, to permit limited independent rotation of each finger 51 relative to the other finger 51. Suitable bushings 53 may be interposed between the fingers 51 and the pivot pin 50 so as to reduce the wear on the fingers themselves. The fingers may also be provided with suitable pads 54 which may vary in thickness in accordance with the diameter of the bar stock which is being fed to the lathe. The pads are provided with a shank portion 55 which is press-fitted in the fingers. The pads can thus be changed when they are worn and they can also be interchanged for larger or smaller sizes when the bar stock size is changed. Set screws 63 may be utilized to further secure the shanks 55 against displacement.

The air valve and cylinder 40 is threadedly secured to the web portion 45 of the yoke 42 as by the threaded sleeve portion 56. The cylinder plunger 57 extends from the piston within the cylinder through the sleeve 56 and is threadedly secured to a rectangular plate 58 which is provided with two oppositely disposed slots 59.

A usual flexible hose, not shown, having one end connected with a supply of compressed air may have its other end connected to the intake side of the air valve and cylinder 40 which is of usual construction.

Two screws 60, having head portions 61 of larger diameter than the width of the slots 59, extend through the slots into threaded engagement with the fingers 51 and are further secured by means of nuts 62.

As will be apparent from an inspection of Figs. 5 and 6, the parts of the clamp assembly 41 are so arranged that when the plunger 57 is in its uppermost or retracted position, the plate 58 bears against the heads 61 of the screws 60 causing the fingers 51 to rotate toward each other to effect a clamping or gripping action. When the plunger 57 moves downwardly, the plate 58 is caused to bear down upon the nuts 62 causing the fingers 51 to rotate in a direction away from each other, that is, to a non-gripping or released position.

The fingers 51 are so positioned as to extend below the diametrical plane of the bar stock W which is being fed into the chuck C, the receiving tube 1 being partially cut away as at 64, to provide a shallow trough 65 in which the bar stock W may be supported although it is exposed to the action of the fingers 51.

The slots 48 in the adjusting plate 14 permit the clamp assembly 41 to be adjusted vertically for proper positioning relative to the bar stock W.

Referring now to Figs. 1, 7 and 8 of the drawings, there are two sensitive electrical switches 66 and 67, such as "micro-switches" suitably secured to the guide rail 28, blocks 68 and 69 being used to elevate the switches to such levels that they will be actuated by a cam lever 70 which is mounted on top of the extension 24 of the guide bar 20.

The cam lever 70 is mounted for pivotal movement about a pivot pin 71 which is secured to an angle bracket or mounting plate 72, which, in turn, is suitably secured to the guide bar 20.

The cam lever 70 lies in a plane which is offset outwardly from the edge of the extension 24, however, the lever is provided with a laterally extending lug 73 which overlies the top surface of the extension 24 and thereby limits counter-clockwise movement of the cam lever 70, as viewed in Fig. 7.

The forward end of the cam lever 70 is rounded as at 74 and the lower edge 75 thereof extends angularly from a level above the switch 66 to a level below the midpoint of the plunger button 76 on the switch.

The rearward end of the cam lever 70 is beveled as at 77 for a purpose to be hereinafter described.

It will be apparent that when the clamp assembly 41 is moved forwardly, the cam lever will travel toward the right, as viewed in Fig. 7. When the lever 70 strikes the plunger button 76 on switch 66, the lever will be cammed by the switch button and will pivot about in a clockwise direction without depressing the plunger button 76. Further forward movement will cause the cam lever 70 to engage a plunger button 78 on switch 67 and cam it to a depressed position.

Rearward movement of the lever 70 will, however, cause the beveled portion 77 to cam the plunger button 76 on switch 66 thereby depressing the plunger.

The forward movement of the piston rod 13 and the parts attached thereto may be otherwise defined as being a feeding movement, and the rearward movement of the piston rod 13 and the parts attached thereto may be otherwise defined as a retracting movement.

Having now described the various components of my bar feeding machine, I will now describe its operation and for that purpose will have particular reference to Fig. 1 and the diagrams shown in Figs. 10-13.

In Figs. 10-13, I have diagrammatically illustrated the lathe L, the chuck C, the cylinder 10, the piston rod 13, the clamp assembly 41, the cam lever 70, the switches 66 and 67 and the bar stock W. I have also shown diagrammatically a cross-slide S on which is mounted a cut-off tool T, a longitudinally movable slide M on which is mounted a drill or centering tool D, and the cut-off work piece P.

In each of my said co-pending applications, Serial No. 750,391 and Serial No. 52,719, there is illustrated and described in detail a lathe including parts similar to the diagrammatically illustrated chuck C, cross-slide S, and the longitudinally movable slide M, and the automatic operation and control of such parts by combined electrically and fluid pressure operated apparatus is shown and described in detail to some extent in my application Serial No. 52,719, and in greater detail in my application Serial No. 750,391.

In Fig. 1 I have shown in broken lines two positions A and B of the clamping assembly as the bar stock is fed into the chuck opening J. The positions A and B correspond to similar positions shown diagrammatically in Figs. 10-13, as will hereinafter be more fully described.

In Fig. 10 I have shown the full forward or feeding movement of the piston rod 13 which is effective to feed bar stock W into chuck C. This movement of the piston rod corresponds to movement from the solid line or first position shown in Fig. 1 to the broken line position A or second position. During this forward movement the bar stock is gripped by the fingers 51 and moves forwardly with the clamp assembly. The cam lever 70 by-passes the switch 66 in the manner heretofore described and engages the switch 67.

The closing of switch 67, through a system of relays and hydraulic controls which are well known in the art, causes the following to occur in rapid sequence: the forward or feeding movement of the piston rod 13 is halted; the jaws of the chuck are closed; and, the solenoid valve controlling the clamp fingers 51 is actuated to release the fingers from clamping position.

The halting of the forward movement of the piston rod 13 is effected by stopping the flow of fluid into the rear end and out of the front end of the cylinder 10 by solenoid actuation of the control valve or valves therefor in a manner similar to that disclosed in said Heintz et al., U. S. Patent No. 2,397,351. The actuation of the solenoid valve controlling the clamp fingers 51 is similarly effected. The chuck may be of the type set forth in my said application Serial No. 52,719 in which the opening and closing of the jaws are effected by a reciprocating fluid motor controlled by a solenoid actuated valve.

During this forward movement of the bar stock W, the cross slide S and the drill slide M are disposed to one side of the lathe bed, out of the path of movement of the bar stock.

The closing of the jaws of the chuck C actuates another set of relays and hydraulic controls which cause the chuck to start rotating and also cause a reversal of flow in the hydraulic cylinder 10 thereby causing the piston rod 13 to retract. Inasmuch as the clamping fingers 51 are in released position, the clamp assembly is free to move with the rod 13, the bar stock W being held by the chuck.

The closing of the jaws of the chuck C may cause the chuck to start rotating by impingement of the piston rod of the chuck actuating fluid motor against a switch controlling a motor driving the chuck. The reversal of flow in the hydraulic cylinder 10 may be effected by similar impingement of another switch by the chuck actuating piston rod, the other switch controlling the operation of the solenoid valve or valves in the hydraulic pressure system of the cylinder 10.

The rod 13 moves rearwardly until the cam lever 70 engages the switch 66. Closing of the switch 66 actuates control mechanism which halts the first rearward or retracting movement of the rod 13 and simultaneously causes the cross-slide S to move laterally, across the bed of the lathe toward the longitudinal or center axis of the lathe as indicated in Fig. 11. The clamp assembly 41 now is in the position B or third position shown in broken lines in Fig. 1.

The halting of the first retracting movement of the rod 13 is effected in a manner similar to the halting of the feeding movement thereof. The lateral movement of the cross-slide S towards the center axis of the lathe may be effected by the actuation of a solenoid valve controlled reciprocating fluid motor, such as shown and described in my application Serial No. 52,719 and in my application Serial No. 750,391.

As the cross-slide moves the cutting tool T engages the revolving bar stock and cuts it off to a predetermined length.

It may be noted at this time, that the spacing between the switches 66 and 67 must, of course, be substantially equivalent to the length of the work-piece P. In other words if the piece P is cut off to a length of 8 inches, for example, the distance between switches 66 and 67 will be 8 inches or more, depending upon the particular conditions of operation. It has been found that upon completion of the cut-off operation, the bar stock has a tendency to withdraw or snap back a short distance. This may be on the order of ½" to 2½", and the distance between switches 66 and 67 must be adjusted accordingly so that the effective distance of retraction of the clamp assembly 41 relatively to the cut bar stock W is 8 inches.

Upon completion of the cut-off operation, the movement of the cross-slide S actuates control mechanism which actuates the solenoid valve 49 causing the plunger 57, 57 to move upwardly and rotate the fingers 51 to clamping position, thereby gripping the bar stock W. The hydraulic pressure on piston rod 13 is also reestablished by the controls, and the rod 13 moves rearwardly or retracts to its original or first position as shown in Fig. 12.

The completion of the cut-off operation may be accompanied by impingement of the cross-slide with a switch which controls the solenoid valve 40, and which may be in another circuit controlling the solenoid valve or valves in the hydraulic pressure system of the cylinder 10 and causing the second retracting movement of the piston rods 13 and attached parts.

The cross-slide S continues to move forwardly across the lathe until the drill slide M is in axial alignment with the cut-off work piece P, at which time movement of the cross-slide ceases and the controls cause drill slide M to move forwardly longitudinally to effect centering or a like end operation on the piece P.

After the drill-slide M has moved forwardly to a predetermined fixed distance, controls are actuated which cause the drill slide M and the cross-slide S to be retracted to their original positions and also cause the rotation of the chuck to be arrested as indicated in Fig. 13.

The return of the cross-slide S to its starting position actuates controls which cause the chuck jaws to release and also cause the piston rod 13 to move forwardly thus reestablishing the next cycle of operation, the finished work P being ejected by the incoming bar stock W.

When the cross-slide returns to its starting position, it may actuate a switch controlling the solenoid valve which may control the reciprocating fluid motor operative to release the chuck jaws, and this switch may also control the solenoid valve or valves in the hydraulic pressure system of the cylinder 10 to cause the piston rod 13 to move forward.

It will be understood the tool slides such as those herein designated S and M can be and usually are provided on both sides of the center-driven chuck C and that additional tool slides may be provided for such turning operations as may be desired.

It will be noted that various elements of the bar feed machine have been made adjustable to permit the machine to handle a wide range of sizes of bar stock and also to permit the machine to be useful with various sizes of lathes. Among these elements are the support member 29 having slot 31 which permits vertical adjustment of the height of the guide rail 28, the adjusting block 17 which is horizontally adjustable relatively to the guide rail 28 and the adjusting plate 14; the guide bar 20 having slot 22 which is vertically adjustable relatively to the guide bar 28 and the adjusting block 17; the slot 33 in the guide rail 28 which permits horizontal adjustment of the cylinder 10 and tube 1 relatively to the guide rail; the adjusting plate 14 having slots 48 which permit vertical adjustment of the clamp assembly 41; and the pads 54 on the clamp fingers 51 which may be replaced by larger or smaller pads to accommodate various diameters of bar stock.

It may also be noted that a sleeve may, if desired, be inserted within the tube 1 of the machine so as to decrease its internal diameter when bar stock of small size is being loaded.

It is further noted that in each cycle of operations longitudinal movements of the piston rod 13 and the clamp assembly 41 are forwardly from the initial or first stationary position of the clamping assembly 41 adjacent the forward end of the cylinder 10, directly to the second stationary position of maximum advance of the clamping assembly 41 adjacent the chuck C, then rearwardly to the intermediate third stationary position of the clamping assembly 41 spaced longitudinally as above stated between the first and second positions, and then rearwardly from the third position to the first position.

The group operations cycle is summarized in the following table:

TABLE OF GROUP OPERATIONS CYCLE

*Group I*

At start of each cycle, clamp assembly 41 and gripped bar stock W are at the first position of maximum retraction from chuck C of lathe L, as shown in full lines in Fig. 1.

1. When cycle starts, piston rod 13, attached clamp assembly 41, and gripped bar stock W move forwardly in the feeding direction towards the chuck C. A proper length of bar stock W extends forwardly of the chuck assembly.
2. As the clamp assembly 41 moves forwardly, the cam lever 70 by-passes the switch 66, and
3. Closes switch 67, the forwardly extending length of bar stock W passing half-way through the open jaws of chuck C.

*Group II*

Closing of switch 67 causes:

1. Stopping of forward movement of piston rod 13, clamp assembly 41, and bar stock W, clamp assembly 41 being at second position shown in broken lines at A in Fig. 1 and in full lines in Fig. 10;

2. Closing of jaws of chuck C on bar stock W; and

3. Actuation of solenoid controlled valve 40 to release clamp fingers 51 from clamping engagement with bar stock W.

*Group III*

Closing of jaws of chuck C causes:

1. Chuck C to rotate bar stock W; and
2. Reversal of flow of fluid in the hydraulic cylinder 10, causing
3. Piston rod 13 and clamp assembly 41 to retract in first rearward movement, and
4. Cam lever 70 to close switch 66.

*Group IV*

Closing of switch 66 causes:

1. Stopping of first rearward movement of piston rod 13 and clamp assembly 41 at intermediate third position of clamp assembly, and
2. Simultaneous movement of cross-slide S laterally from withdrawn position shown in Fig. 10 to cut-off position shown in Fig. 11, in which cutting tool is fed into rotating bar stock W.

*Group V*

After completion of cut-off operation, lateral movement of cross-slide S continues and causes:

1. Actuation of solenoid valve 40 to cause piston plunger 57 to move upwardly and rotate fingers 50 to clamping engagement with bar stock W at intermediate third position;
2. Movement of piston rod 13, clamp assembly 41, and gripped bar stock rearwardly, and stopping thereof at first position.
3. Cross-slide S, continues lateral movement until drill M is in axial alignment with cut-off work piece P, when
4. Lateral movement of cross-slide stops, and
5. Drill M moves towards work piece to center or perform other end operation on work piece P.
6. Movement of drill slide M towards work piece is stopped at fixed point causing
7. Retraction of drill slide M and cross slide S away from work piece P and laterally to initial position shown in Fig. 13 and
8. Stopping of rotation of chuck C.

*Group VI*

Return of cross slide S to starting position causes:

1. Chuck jaws to release work piece P, and
2. Piston rod P, clamp assembly 41, and bar stock W to move forwardly, starting another cycle of operations.

Fig. 14 is a diagram of the hydraulic system for the combined bar feeding machine and automatic lathe illustrated and described, and Fig. 15 is a diagram of the electric system therefore. The components of the system operate in a usual manner, except as otherwise set forth above.

I have thus described the structure and functioning of my retractable bar feed machine and have indicated the manner in which its operation permits automatic and continuous operation of a center-driven lathe without interfering with the operation of the tool slides.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. The method of handling bar stock comprising the steps of gripping the bar stock at a first position and at an initial position of the bar stock, advancing the bar stock, releasing the bar stock at a second position, severing the bar stock, gripping the bar stock at a third position spaced between the first and second positions, and retracting the bar stock to its initial position.

2. In a machine for moving bar stock in the direction of its longitudinal axis by advancement from a first position to a second position longitudinally spaced from the first position and by retraction to the first position from a third position longitudinally spaced between the first and second positions, the combination including longitudinally extending guide and support means for the bar stock, the guide and support means having a forward end and a longitudinal axis parallel with the longitudinal axis of a bar stock supported thereby, a movable gripping means operative for selectively gripping and releasing a bar stock extending beyond the forward end of the guide means, the gripping means being movable in opposite directions of advancement and retraction parallel to the longitudinal axis of the bar stock guide and support means, reciprocating motor means including a reciprocating member connected with the gripping means and extending longitudinally parallel with the longitudinal axis of the bar stock guide and support means, and means controlling the operation of the gripping means and the motor means, the controlling means including longitudinally spaced switch units at one side of the path of movement of the gripping means, one of the switch units being located at the second position and the other switch unit being located at the third position, and switch actuaing means on the gripping means, the switch actuating means including a member operative to by-pass the switch at the third position and actuate the switch at the second position on advancing movement of the gripping means and to actuate the switch at the third position on retracting movement of the gripping means.

3. In a machine for moving bar stock, the combination including movable gripping means operative for selectively gripping and releasing bar stock, means mounting the gripping means for intermittent movement in opposite longitudinal directions of advancement and retraction by advancement from a first stationary position to a stop at a second stationary position longitudinally spaced from the first stationary position and by retraction from the second stationary position to a stop at a third stationary position longitudinally spaced between the second stationary position and the first stationary position by retraction from the third stationary position to a stop at the first stationary position, reciprocating motor means including a longitudinally extending reciprocating member connected with the gripping means for effecting said movements and stops, and control means for the motor means including switches located at the second and third stationary positions, and a switch actuating member on the gripping means.

4. In a machine for moving bar stock as set forth in claim 3, and in which motor means operate the gripping means, and control means for the gripping means motor include the switch at the second position.

5. In a machine for moving bar stock as set forth in claim 3, and in which the switch actuating member is a lever having a front end and a rear end, and means pivot the front end of the lever on the gripping means, and the switches each include a plunger button, the plunger button of the switch at the third position being closer to the path of travel of the gripping means than the plunger button of the switch at the second position, and the plunger button of the switch at the second position lying in the path of travel of the front end of the lever for actuation thereby on the advancement of the gripping means, and the plunger button of the switch at the third position being displaced from the path of travel of the front end of the lever and lying in the path of travel of the rear end of the lever for actuation thereby on the retraction of the gripping means.

6. In a bar stock feeding machine, the combination of movable gripping means operative for selectively gripping and releasing bar stock, propelling means connected with said gripping means, the propelling means being operative for moving said gripping means in opposite directions, one direction of movement being advancing and the other direction of movement being retracting, and means controlling the operation of said gripping means and said propelling means, the controlling means including spaced switch units located for successive impingement by the gripping means, the gripping means being successively located during a cycle of operations at a first position at a second position of maximum advanced displacement from the first position, and at a third position between the first and second positions, one of the switch units being located at the second position and the other switch unit being located at the third position and switch actuating means on the gripping means, the switch actuating means including a member operative to by-pass the switch at the third position and actuate the switch at the second position on the advancing movement of the gripping means and to actuate the switch at the third position on the retracting movement of the gripping means.

7. In a bar stock feeding machine, the combination of bar stock clamping means operatively mounted for longitudinal advancing and retracting movements in opposite directions parallel to a longitudinal axis of bar stock movement, the clamping means including clamping fingers movable towards and away from each other and the longitudinal axis of bar stock movement for clamping and unclamping a bar stock extending between the clamping fingers and having a longitudinal axis located in the longitudinal axis of bar stock movement; first motor means including a reciprocable member connected to said clamping means for advancing said clamping means from a stop at a first position to a stop at a second position of maximum advancement, and for retracting said clamping means from the second position to a stop at a third position between the second position and the first position, and for retracting said clamping means from the third position to a return stop at the first position; second motor means for operating the clamping means to selectively move the clamping fingers towards and away from each other to bar stock clamping and unclamping positions; control means for the first motor means, the first motor control means including means operating the first motor means to advance the clamping means from a stop at the first position to a stop at the second position, means operating the first motor means to retract the clamping means from the stop at the second position to a stop at the third position, and means operating the first motor means to retract the clamping means from the stop at the third position to a return stop at the first position; and control means for the second motor means, the second motor control means including means operating the second motor means to maintain the clamping fingers in clamping position at the first position and during movement of the clamping means from the first position to the second position, means operating the second motor means to move the clamping fingers to unclamping position at the stop of the clamping means at the second position and during movement of the clamping means from the second position to the stop at the third position, and means operating the second motor means to move the clamping fingers to clamping position at the stop of the clamping means at the third position and during movement of the clamping means from the third position to the return stop at the first position.

8. In a bar stock feeding machine, the combination as set forth in claim 7, and in which the longitudinal movements of the clamping means and the longitudinal axis of bar stock movement are horizontal.

9. In a bar stock feeding machine, the combination as set forth in claim 7, and in which the first motor control means and the second motor control means include means coordinating their operations with each other.

STANFORD OVSHINSKY.

References Cited in the file of this patent

UNITED STATES PATENTS

| Number | Name | Date |
| --- | --- | --- |
| 2,065,003 | Lovely | Dec. 22, 1936 |
| 2,244,925 | Tyne | June 10, 1941 |
| 2,289,167 | Bannister | July 7, 1942 |
| 2,369,466 | Kylin et al. | Feb. 13, 1945 |
| 2,389,556 | Siegerist | Nov. 20, 1945 |
| 2,484,601 | Abbey | Oct. 11, 1949 |
| 2,491,901 | Moohl et al. | Dec. 20, 1949 |